(12) United States Patent
Loper

(10) Patent No.: US 6,240,959 B1
(45) Date of Patent: Jun. 5, 2001

(54) HYDRAULIC SAFETY FUSE DEVICE

(76) Inventor: Donald M. Loper, 5801 W. Brentwood Ave., Milwaukee, WI (US) 53223

(*) Notice: Subject to any disclaimer, the term of this patent is extended or adjusted under 35 U.S.C. 154(b) by 0 days.

(21) Appl. No.: 09/475,616

(22) Filed: Dec. 30, 1999

(51) Int. Cl.[7] .................................................. F16K 17/24
(52) U.S. Cl. ............................ 137/599.01; 137/599.08; 137/601.14; 137/625.32; 251/16
(58) Field of Search ..................... 137/599.01, 599.03, 137/599.05, 599.07, 599.08, 599.09, 599.11, 601.01, 601.13, 601.14, 601.16, 601.2, 607, 625.32; 251/15, 16

(56) References Cited

U.S. PATENT DOCUMENTS

| | | | | |
|---|---|---|---|---|
| 3,494,375 | * | 2/1970 | Henaughan | 251/16 |
| 4,256,100 | * | 3/1981 | Levy et al. | 137/599.05 |
| 4,819,688 | * | 4/1989 | Field | 137/493.6 |
| 5,076,321 | * | 12/1991 | Terry | 137/601.14 |
| 5,313,871 | * | 5/1994 | Kaneko et al. | 137/599.08 |
| 5,603,352 | * | 2/1997 | Tavor | 137/599.11 |

* cited by examiner

Primary Examiner—Stephen M. Hepperle
Assistant Examiner—Ramesh Krishnamurthy
(74) Attorney, Agent, or Firm—Ryan Kromholz & Manion, S.C.

(57) ABSTRACT

A protective device for a hydraulic system includes a block which forms a housing with at least one fluid flow inlet into the housing and at least one fluid flow outlet. A plurality of fluid flow channels within the housing connect the inlet and the outlet. Each of the fluid flow channels contain a hydraulic fuse adapted to close its associated fluid flow channel when a selected flow rate of hydraulic fluid is exceeded, each of the fuses having a different selected fluid flow rate which causes closure thereof. A valve in each of the fluid flow channels provides for selectively opening and closing the fluid flow channels so that a selected one of the channels is open and all others of the channels are closed. The valves may be integral with single rotatable valve stems, or of various alternative designs, for example, maunually, mechanically or electronically controlled valves.

9 Claims, 5 Drawing Sheets

HYDRAULIC SAFETY FUSE DEVICE

BACKGROUND OF THE INVENTION

This invention relates to safety devices for hydraulic systems. More specifically, the invention relates to a hydraulic velocity fuse safety device operable to selectively protect systems which may function at any of several selected fluid flow rate settings.

Heretofore hydraulic fuses have been used, for example, in aircraft systems to prevent the escape of hydraulic fluid in the event of a rupture somewhere in the closed hydraulic system. Such fuses are configured so that the fluid flow passage is closed when a selected rate of fluid flow in the line is exceeded. Such existing devices are useful in systems which operate only at one selected rate of flow of hydraulic fluid.

Hydraulic systems typically in use, such as those used on mobile truck mounted systems, however, suffer from the lack of appropriate protective devices. Thus, in the event a hydraulic hoist is used, a 25 to 50 gallons per minute of hydraulic fluid flow is required. Subsequently, after a worker has been elevated to a selected height, a portable tool operated by the same hydraulic system may be needed. Such a tool, however, may require a hydraulic fluid flow rate of only five to ten gallons per minute. On many jobs it is necessary to work, alternately, with tools requiring different fluid flow rates. It has been impractical to protect such systems with prior art hydraulic fuses, particularly in view of the fact that the hydraulic fluid flow rate varies greatly when the engine rpm's on host vehicle are increased. Thus, a 10 gpm fuse would not protect workers using a 50 gpm tool.

Often, when a hydraulic hose ruptures, the hot hydraulic fluid in the system escapes in the form of a hot oil spray. This escaping hot hydraulic fluid may severely burn the affected workers and also may be sprayed into the surrounding area with resultant environmental damage. A great need has thus existed for improved safety devices for such hydraulic systems.

SUMMARY OF THE INVENTION

It is an important object of the present invention to provide protective devices for hydraulic fluid systems which will safely stop the escape of hydraulic fluid from a system in the event of a leak or rupture. An important related object is to provide such protective devices which can be selectively operated to prevent escape of hydraulic fluid at any one of several selected maximum flow rates. The selected maximum flow rates are dependent upon the requirements of the particular system and the particular accessories operated in connection therewith. A further aspect of the invention provides that multiple protective devices are mounted within a single housing. In accordance with a yet further aspect of the invention a housing which contains a plurality of protective fuse devices is provided a valve assembly which enables the use of any selected one of the fuse devices.

In accordance with a further related aspect of the invention a number of hydraulic fuse devices of varying gallon per minute flow ratings are mounted in parallel within a single housing block within individual fluid flow channels therein. In accordance with a still further related aspect of the invention each fluid flow channel within the housing block may be selectively shut off by means of a valve within the channel.

In accordance with one embodiment of the invention, a valve arrangement is provided which allows one single hydraulic flow fuse device to be in an open fluid flow channel while simultaneously closing all of the other parallel fluid flow channels within the block, thereby enabling the selection of a protective hydraulic fuse suitable to allow operation of a selected hydraulically operated attachment, thus protecting the hydraulic system against excessive flow rates which might occur in the event of a rupture or other cause of overspeeding.

In accordance with another embodiment of the invention, electrically controllable valves may be provided with a control system configured to enable opening of a single flow channel while closing all other flow channels.

Briefly, the invention provides a protective device for a hydraulic system which includes a block that forms a housing with at least one fluid flow inlet into the housing and at least one fluid flow outlet. A plurality of fluid flow channels within the housing connect the inlet and the outlet. Each of the fluid flow channels contains a hydraulic fuse adapted to close its associated fluid flow channel when a selected flow rate of hydraulic fluid is exceeded, each of the fuses having a different selected fluid flow rate which causes closure thereof. A valve in each of the fluid flow channels provides for selectively opening and closing the fluid flow channels so that a selected one of the channels is open and all others of the channels are closed. The valves may be integral with a single rotatable stem, or of various alternative designs, for example, electronically controlled valves.

Further objects and advantages of the invention will be apparent from the accompanying claims, the following detailed description and the accompanying drawings.

DETAILED DESCRIPTION OF THE INVENTION

Figure 1:
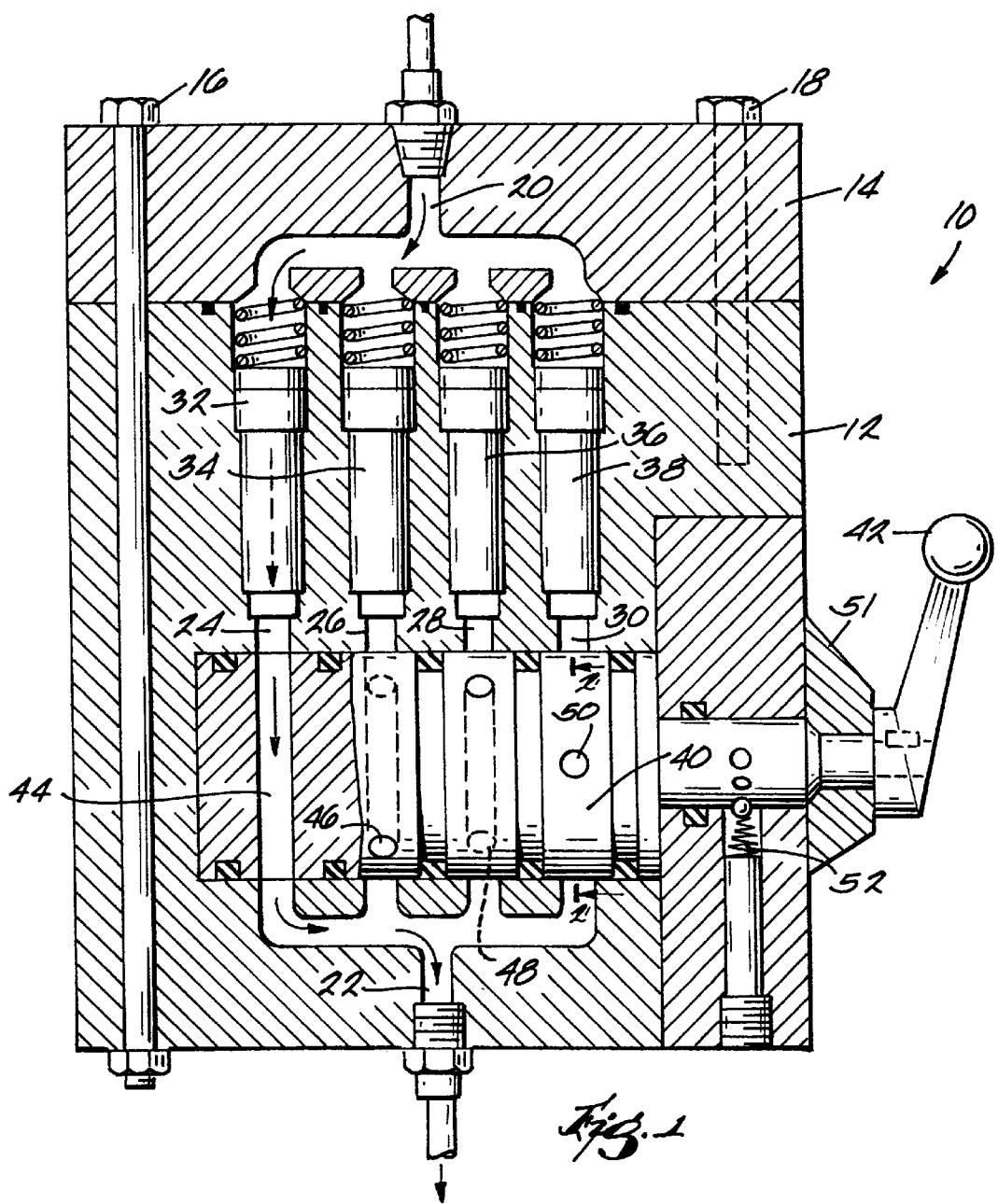
FIG. 1 is a cross-sectional view showing a hydraulic fuse assembly in accordance with the invention.
Figure 2:
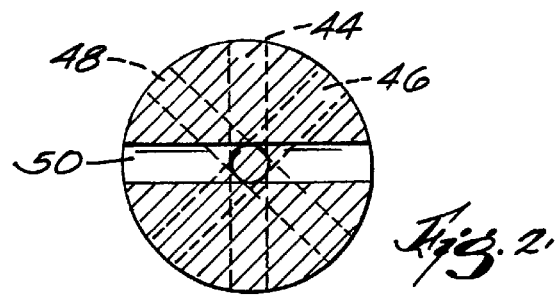
FIG. 2 is a cross-sectional taken along Line 2—2 of FIG. 1.

Referring more specifically to the drawings, a hydraulic fuse assembly 10 of this invention in accordance with one embodiment is seen FIGS. 1 and 2. Assembly 10 is formed in a block consisting of two parts, 12 and 14. Block parts 12 and 14 are formed of a metal such as steel, aluminum, brass, etc. and are mechanically secured together for example, by bolts 16 and 18. A fluid flow inlet 20 is provided for inflow of hydraulic fluid, as illustrated. At the opposite end of block 12 is an outflow outlet 22.

A manifold arrangement is provided interiorly of block 12, including, in the illustrated embodiment, four individual flow channels 24, 26, 28 and 30. These flow channels contain hydraulic fuses 32, 34, 36 and 38, respectively. Each of the hydraulic fuses 32, 34, 36 and 38 are of known types heretofore commercially available, for example, of the type shown in U.S. Pat. No. 4,819,688, the disclosure which is incorporated by reference. Because of the two-part block configuration shown in the drawings, the flow channels are readily accessible, thereby enabling quick changing of the individual fuses, even under field conditions. Therefore, upgrades, maintenance or repairs, such as replacement of seals or other worn parts, are convenient in accordance with the invention.

In accordance with the invention each of the hydraulic fuses 32, 34, 36 and 38 are of a different flow rating so that a variety of operation conditions can be controlled by the assembly 10. For example, in accordance one embodiment, fuse 32 maybe rated so it stops flow through channel 24 if 7 gallons per minute of fluid flow are exceeded. Fuse 34 would, then, for example, be rated so that channel 26 is closed if a flow rate of 11 gallons per minute is exceeded. Similar ratings of 26 gallons per minute and 55 gallons, respectively, would be appropriate examples for fuses 36 and 38, respectively. Other combinations of fuses having different flow ratings are used in other particularthe foregoing specific examples being given for purposes of illustration only, and not by way of limitation.

A flow controller valve assembly 40 is provided for operation of the safety device of this invention. Valve assembly 40 is arranged so that flow will occur through a selected one of the fuses 32, 34, 36 and 38 but the flow is blocked through the other three fuses. Thus, if the assembly is used on a lift device requiring a flow of 50 gallons per minute, hydraulic fluid would be directed to flow only through channel 30 and fuse 38. Then, with the device in the desired position, and assuming a hydraulic tool were to be operated which required a hydraulic fluid flow of 10 gallons per minute, passage 26 would be selected to be opened and all other passages closed so that the flow would be controlled by fuse 34. Then, if a line rupture or other leakage occurred so that hydraulic flow exceeded 11 gallons per minute fuse 34 would close channel 26. Thus loss of hydraulic fluid and danger of injury to the operator is averted.

Similarly, if a small tool is subsequently used which requires up to 5 gallons per minute of hydraulic fluid flow, channel 24 would be selected to be open so that all hydraulic fluid flow would cease if 7 gallons per minute were exceeded.

In the example shown in FIGS. 1 and 2, in order to control the channels 24, 26, 28 and 30 a rotary valve assembly is controllable by a handle 42. The assembly 40 has a series of fluid flow channels 40, 46, 48 and 50 each of which is alignable to selectively open a selected one of channels 24, 26, 28 and 30, respectively. As also seen in FIG. 2, these channels are arranged so that only one channel can be opened at any given time. Usually a dial 51 would be provided which would be alignable with a series of numerals indicating which fuse was being selected. Also, a detent device 52 is preferably provided to assist in aligning and stopping rotation of the valve assembly at the correct positions.

Figure 3:
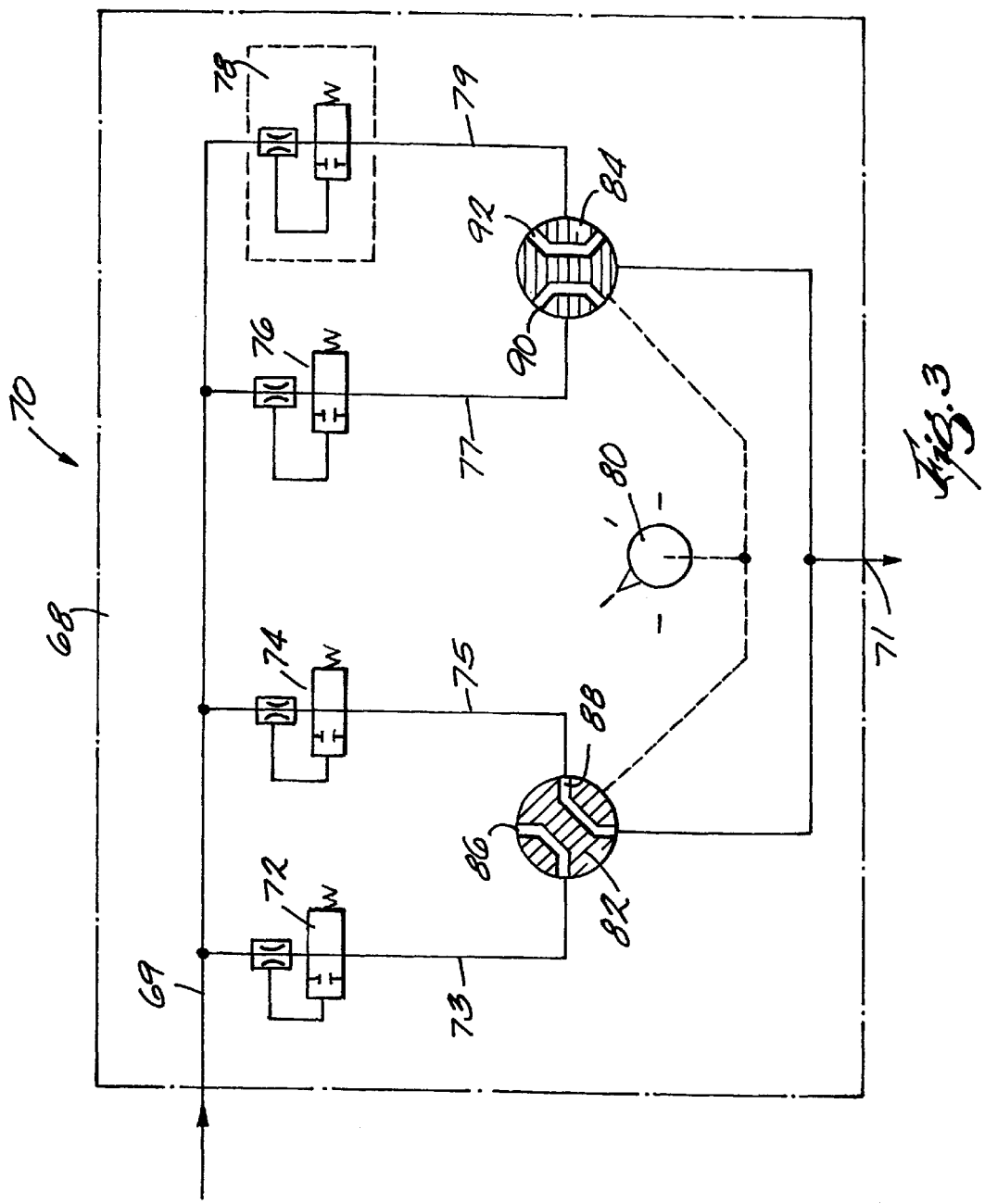
FIG. 3 is a diagrammatic view illustrating another embodiment of the invention.
Figure 5:
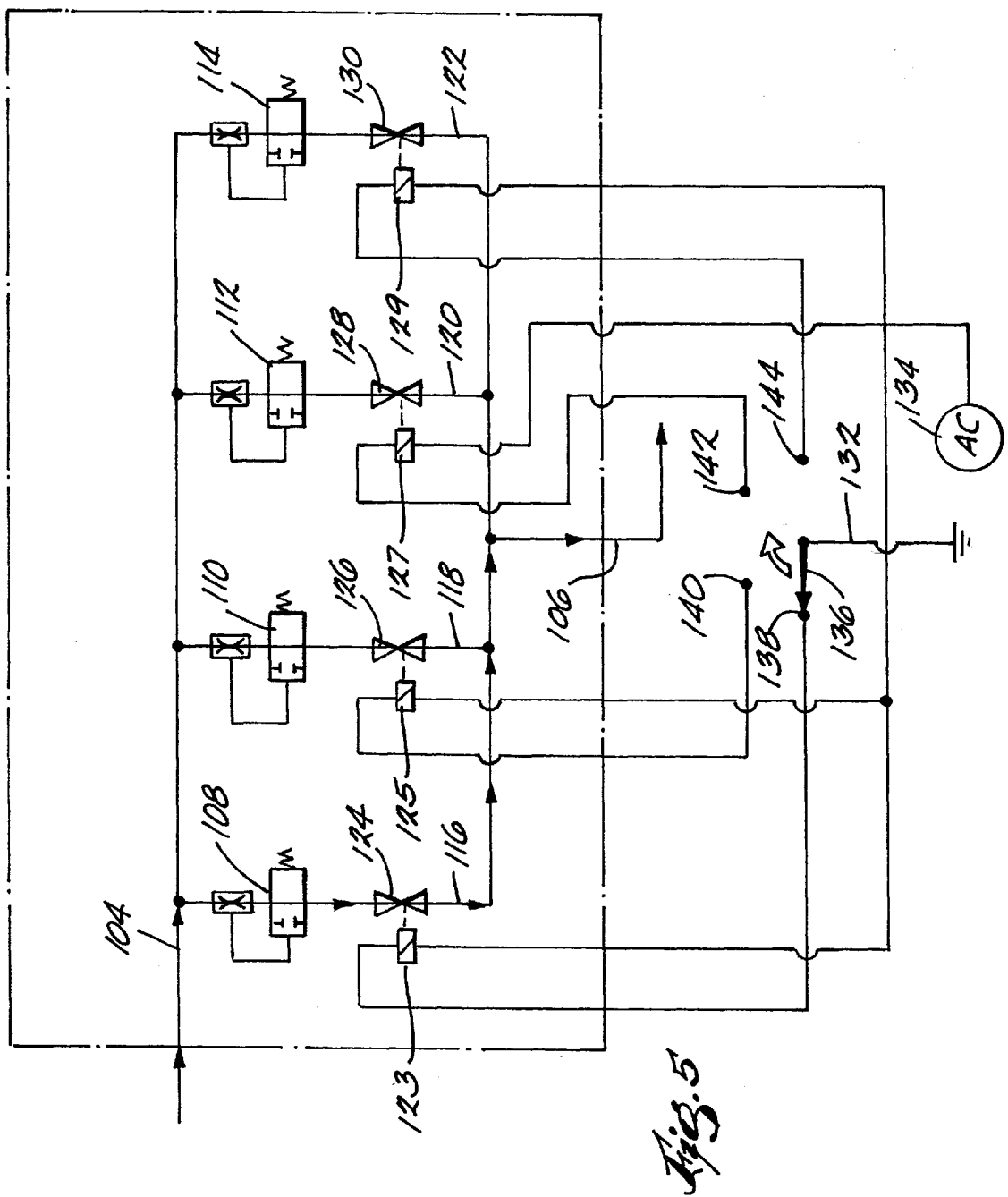
FIG. 5 is another diagrammatic view illustrating an electrical control system suited for electronic control of the embodiment set forth in FIG. 3.

Referring next to FIG. 3, an alternative hydraulic fuse assembly 70 of this invention is diagrammatically illustrated. Assembly 70 includes a housing 68 which includes an inflow channel 69 and an outflow channel 71. A series of hydraulic fuses 72, 74, 76 and 78 are illustrated diagrammatically. These fuses control internal flow passages 73, 75, 77 and 79, respectively. A flow controller 80 controls the orientation of flow diverter valves 82 and 84. Controller 80 can be used to rotate the valves 82 and 84 utilizing appropriate solenoids as shown in FIG. 5. Valve 82 has a pair of internal flow channels 86 and 88 thus, by rotation of valve element 82, channels 73 or 75 can selectively be opened for fluid flow.

Alternatively, the channels 86 and 88 can be rotated so neither flow channel is open. Similarly valve 84 has a pair of channels 90 and 92 adapted to open and close fluid flow channel 77 and 79, respectively. Controller 80 is wired or mechanically connected to control the valve elements 82 and 84 so that only one selected fluid flow channel is open at any one time, thus providing protection of the system, as needed, by a selected one of fuses 72, 74, 76 or 78.

Figure 4:
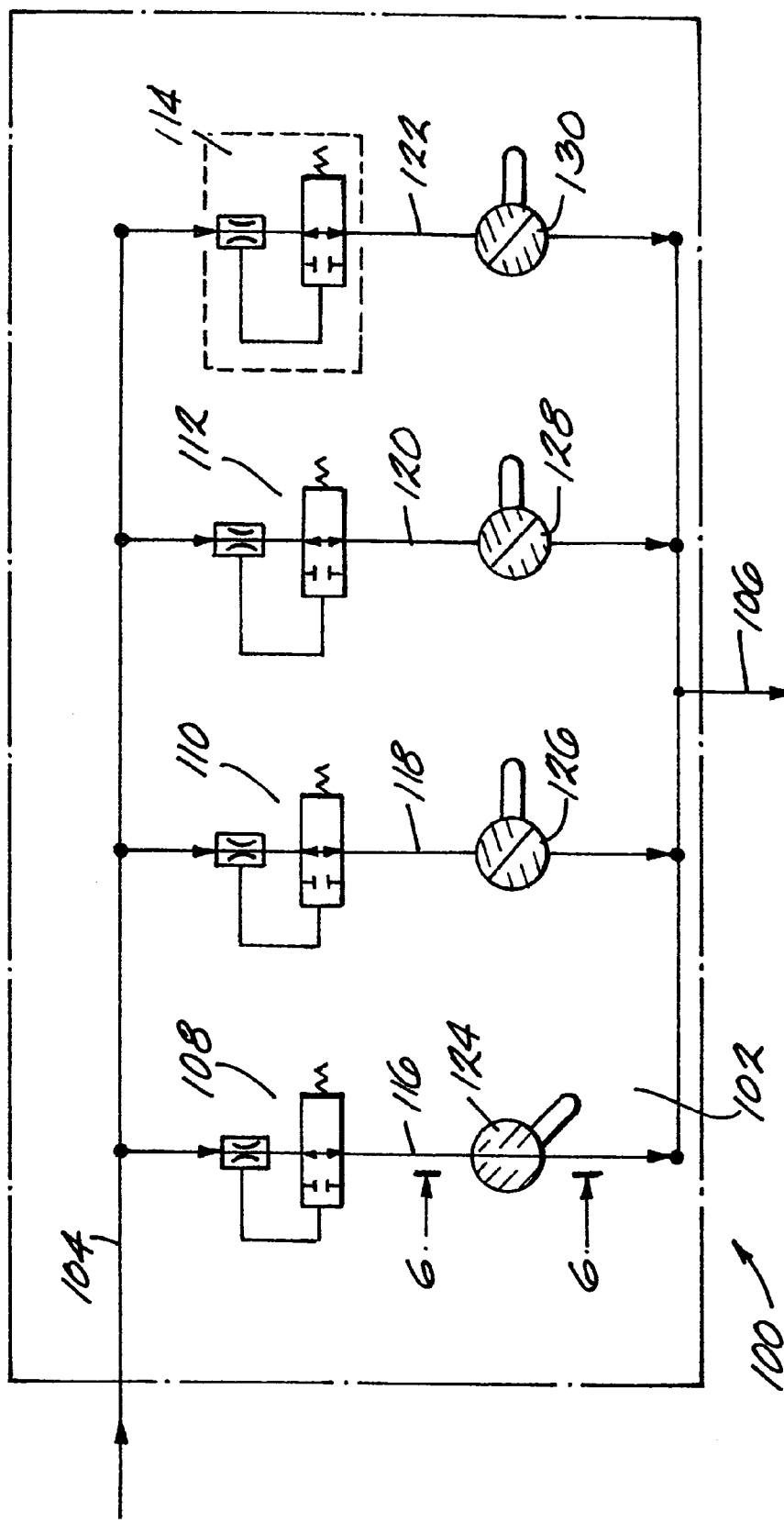
FIG. 4 is another diagrammatic view illustrating yet another embodiment of the invention.

Another embodiment of the invention is illustrated in FIGS. 4 and 5. In this embodiment, as in FIG. 3, the hydraulic fuses are diagrammatically illustrated using hydraulic industry symbols therefore. In this arrangement, four fluid flow paths are provided between a inflow conduit 104 and an outflow conduit 106. These fluid flow conduits 116, 118, 120 and 122 are provided with in line hydraulic velocity fuses 108, 110, 112 and 114, respectively. As in the previous embodiments these four hydraulic fuses are all of differing selected values of allowable fluid flow above which they will shut off the flow in their respective hydraulic fluid flow channels.

In this case, individual rotatable valves 124, 126, 128 and 130 are provided to control the flow through channels 116, 118, 120 and 122, respectively.

The fuse device of FIG. 4 is generally identified by numeral 100 and is contained in a block 102 similar to that described in connection with the earlier described embodiments.

As shown in FIG. 5, valves 124, 126, 128 and 130 are, respectively, controlled by individual electronically actuated solenoids 123, 125, 127, and 129. A ground connection 132 to an alternating current 134 is provided, as are switched power supply wires 138, 140, 142 and 144. Each of these circuits is selectively energized by means of switch 136. It will be appreciated that with the illustrated arrangement, only one of the solenoids can be energized at any one time. Thus, only one of the valves 124, 126, 128 or 130 can be open at any given time. As illustrated in FIGS. 4 and 5 only valve 124, actuated by solenoid 123, is shown in the open position while the remaining valves are all closed.

Figure 6:
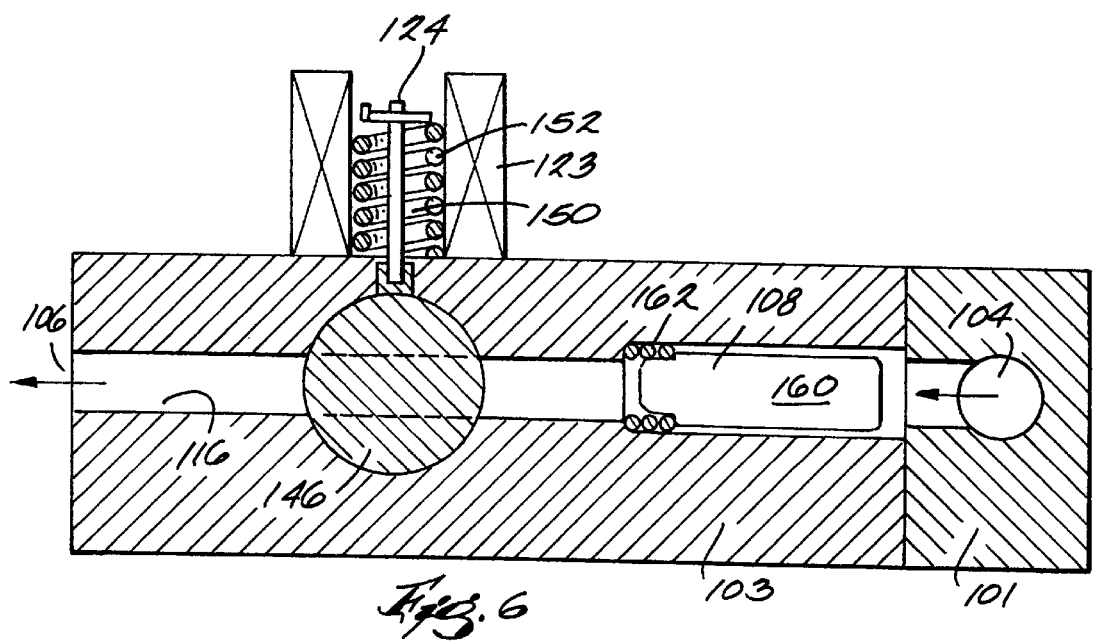
FIG. 6 is a side cross-sectional view in somewhat diagrammatic form taken along Line 6—6 of FIG. 4.
Figure 7:
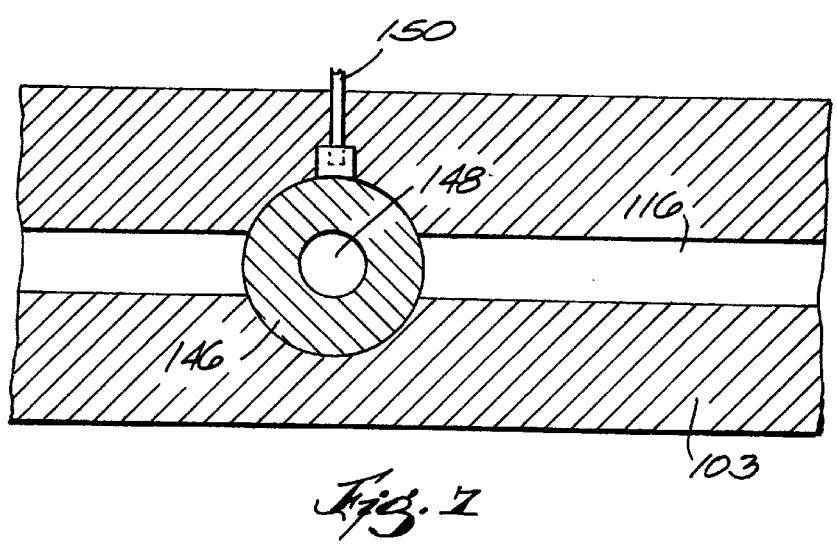
FIG. 7 is a fragmentary cross-sectional view showing the valve of FIG. 6 in the closed position.

Valve 124 is further diagrammatically illustrated in FIGS. 6 and 7. This valve may be of a commercially available solenoid controlled shutoff valve. As illustrated a ball valve 146 has an open channel 148 alignable with channel 116 to enable flow between inlet 104 and outlet 106. This flow passes through and around fuse 108. As shown, stem 150 enables rotation of the valve body 146 when solenoid 123 actuates ball valve 124. Valve body 146 is shown in the de-energized, spring loaded closed position in FIG. 7 with channel 148 having been rotated to close passage 116. When solenoid 123 is de-energized, spring 152 returns valve 146 to the closed position, thereby shutting off flow 104 from port 106. Thus, when the solenoids are deenergized, all flow passages are closed. One of the solenoids must be energized to open its corresponding passage.

As also seen in FIG. 6, fuse 108 is shown to be of a type wherein a poppet valve body 162 is urged to the left, as illustrated, by the flow, which, if excessive, will close channel 116. A return spring 162 biases the poppet valve 160 to the open position thus enabling use of the hydraulic fluid circuit once the excessive flow from inlet 104 has been terminated, for example, by repair or replacement of a ruptured hydraulic line or other leaking part.

The foregoing examples accompanying drawings are illustrative of the principals of this invention. Because the invention may be embodied in other specific forms without departing from the spirit and essential principals of the invention, these embodiments should be considered as exemplary and illustrative rather than restrictive. Thus all modifications described herein that come within the meaning and range of equivalence of the accompanying claims are embraced within the scope of the invention.

What is claimed is:

1. A protective device for a hydraulic system comprising
   a block forming a housing;
   at least one fluid flow inlet into said housing;
   at least one fluid flow outlet from said housing;
   a plurality of fluid flow channels within said housing connecting said at least one inlet and said at least one outlet,
   each of said fluid flow channels containing a hydraulic fuse adapted to close its associated fluid flow channel when a selected flow volume is exceeded, each of said fuses having a different selected fluid flow volume which causes closure thereof, and,
   a valve in each of said fluid flow channels for selectively opening and closing said fluid flow channels.

2. A device according to claim 1 wherein each valve in said channels is interconnected so that a selected one of said channels is open and all others of said channels are closed.

3. A device according to claim 2 wherein each valve in said channels is integral with a single rotatable stem.

4. A device according to claim 2 wherein each valve in said channels is electronically controlled by means of solenoids.

5. A device according to claim 4 wherein each valve in said channels comprises rotary ball valve which is rotatably controlled by said solenoids.

6. A device according to claim 1 wherein said housing comprises a metal block wherein said channels are formed.

7. A device according to claim 6 wherein said housing comprises two separable parts which enable replacement of each said fuse in said channels under field conditions.

8. A device according to claim 6 wherein each said fuse in said channels comprises a poppet valve, one of which is positioned in each of said channels.

9. A protective device for a hydraulic system comprising
   a single fluid flow inlet;
   a single fluid flow outlet;
   a plurality of fluid flow channels arranged in parallel and connecting said inlet and said outlet,
   each of said fluid flow channels containing a hydraulic fuse adapted to close its associated fluid flow channel when a selected flow volume is exceeded, each said fuse in said channels having a different selected fluid flow volume which causes closure thereof, and,
   a valve in each of said fluid flow channels for selectively opening and closing said fluid flow channels.

* * * * *